Sept. 4, 1962  E. K. KINTNER  3,052,444
VALVE

Filed Oct. 14, 1959  2 Sheets-Sheet 1

INVENTOR.
Edwin K. Kintner
BY
William J. Ruano
ATTORNEY

Sept. 4, 1962 E. K. KINTNER 3,052,444
VALVE
Filed Oct. 14, 1959 2 Sheets-Sheet 2

INVENTOR.
Edwin K. Kintner
BY
William J. Ruano
ATTORNEY

United States Patent Office

3,052,444
Patented Sept. 4, 1962

3,052,444
VALVE
Edwin K. Kintner, Johnstown, Pa., assignor to Kinwell Development Company, Davidsville, Pa.
Filed Oct. 14, 1959, Ser. No. 846,448
2 Claims. (Cl. 251—62)

This invention relates to valves and, more particularly, to throttling valves and piston valves of the on-off type. Such valves may be automatically operated, such as by air pressure, or may be manually operated, as desired.

An outstanding disadvantage of conventional heavy duty valves used for the control of the flow of liquid, such as milk, when operated by air pressure, is that often times when leakage develops, air escapes into the milk, or perhaps the milk escapes into the air chamber, thus contaminating the milk and air chamber and causing operating difficulties.

Another outstanding disadvantage of well known types of valves including a piston slidable therein having a piston ring, such as an O ring across a transverse port, is that such ring generally has the tendency to bulge radially outwardly when no longer under compression, as when crossing the port, so that upon reverse movement away from the port, a shearing or wearing action takes place as the ring is again placed under compression, causing relatively short life of the ring.

A still further disadvantage of conventionally used valves for controlling the flow of milk and the like is that they are relatively complicated in construction and cannot be readily taken apart without disturbing the air operating mechanism, for the purpose of cleaning from time to time as is necessary to insure cleanliness of the milk or other liquid.

An object of my invention is to provide a novel valve which is devoid of the above named disadvantages and which is of such construction as to prevent the possibility of flow of air under pressure in the air cylinder into the liquid or vice versa.

A further object of my invention is to provide the proper construction and relationship in a valve having an O ring about its piston so that the O ring will not wear excessively as a result of crossing a port at right angles to the valve body.

A still further object of my invention is to provide an air operated valve of the throttling or piston type which is of relatively simple construction and which can be readily taken apart in a manner so that the parts through which the liquid flows may be easily and quickly separated from the air piston or power operating parts and thoroughly cleaned from time to time, as desired, without disturbing the power operating parts.

Other objects and advantages of my invention will become more apparent from a study of the following description taken with the accompanying drawings wherein.

Figure 1:
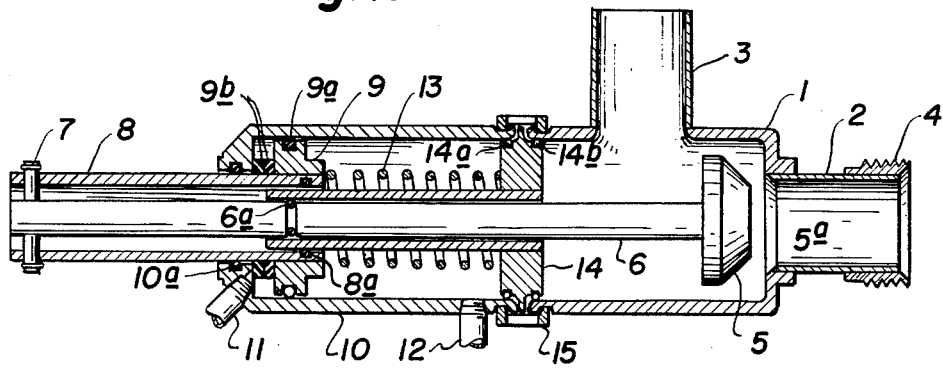
FIG. 1 is a longitudinal, cross-sectional view of a throttling valve embodying my invention and shown in the open position.
Figure 2:
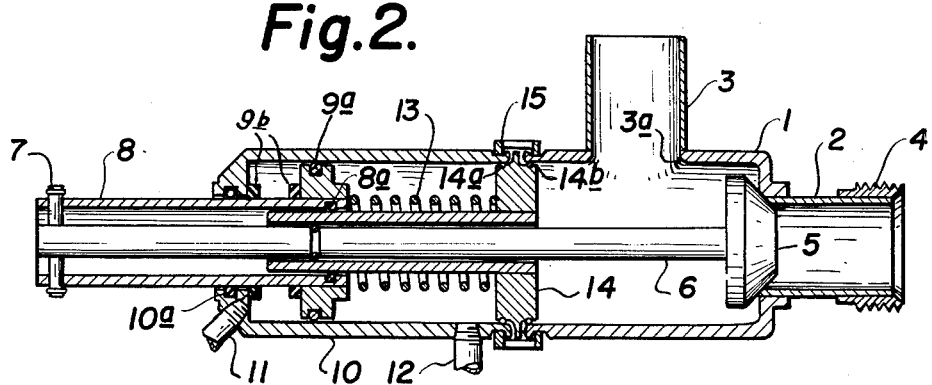
FIG. 2 is a longitudinal, cross-sectional view of the valve shown in FIG. 1 but in the closed position.
Figure 3:
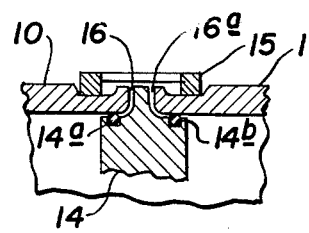
FIG. 3 is a fragmentary enlarged view showing the manner the valve body parts of FIGS. 1 and 2 are clamped together.

Referring more particularly to FIGS. 1 and 2 of the drawings, numeral 1 denotes a valve body, preferably of stainless steel or other suitable material which will not contaminate liquid flowing therein as the result of oxidation or the like. Numeral 2 denotes a sleeve, preferably of the same material, welded or otherwise integrally secured to body 1 and having a threaded coupling element integrally attached to the end portion thereof for connection to a pipe or conduit (not shown) through which milk or other liquid flows. Tube 3, integrally secured to body 1, is also preferably made of stainless steel or the like. Tubes 2 and 3 provide inlet and outlet connections, or vice versa, for the flow of liquid such as milk, which flow may be adjustably varied by throttling valve 5 integrally secured to a valve stem 6. Stem 6 has a peripheral groove containing an O sealing ring 6a which forms a seal with the interior of the tubular part of a stationary bearing which is integrally secured to an annular part 14 of the stationary bearing, to serve as a guide for both the valve stem 6 and air piston 9. Air piston 9 is integrally secured to a tube 8 having an O-ring 8a in an internal peripheral groove to form a seal with the exterior surface of the tubular part of the stationary bearing.

The left extremity of tube 8, as viewed in FIG. 1, is rigidly connected by a piston connecting pin 7 to the left extremity of valve stem 6 so as to rigidly connect the throttling valve 5 and air piston 9 together so they will move in unison. A helical compression spring 13 is provided between piston 9 and part 14 of the stationary bearing so as to normally urge the air piston 9 to the left to the position shown in FIG. 1, that is, the open position of the valve wherein the two stop cushioning rings 9b come into contact to cushion and limit leftward movement of the air piston 9.

Air inlet and outlet ports 11 and 12, respectively, are provided which may be connected to a conventional air solenoid (not shown) for selectively introducing air under pressure into inlet connection 11 to effect movement of the air piston 9 and valve stem 5 to the right in unison until the valve becomes seated or is in the closed position as shown in FIG. 2. Of course, upon release of air pressure in the chamber to the left of piston 9, return spring 13 will effect movement to the left as shown in FIG. 1. Air piston 9 has a peripheral groove provided with an O-ring 9a to form a seal with the internal surface of air chamber 10. Another seal is formed by O-ring 10a at the end portion of the air chamber which contacts the external surface of sleeve 8.

It will be noted that the valve generally comprises two portions, an operating portion to the left of stationary bearing part 14 and a working portion to the right thereof, through which milk or other liquid flows. These two portions are separate but may be clamped together by a clamp 15 of any well known type, such as one with a thumb screw for shrinking the diameter. Peripheral grooves having O-rings 14a and 14b are provided between the stationary part 14, air chamber 10 and valve body 1 to provide a seal therebetween. Passageways 16 and 16a lead from these grooves to the outside atmosphere so that in the event of leakage, either of air under pressure in chamber 10 or of milk in body 1, such leakage will be to the outside atmosphere, rather than permitting air to flow into the milk, or vice versa. In case of leakage of the milk through passageway 16a, a visible indication of the leakage is provided so as to warn the attendant to replace the O-ring 14b.

It will be noted further that air within the air chamber 10 cannot leak directly into the milk chamber or valve body 1 through any other path, and whatever leakage that can occur would be directly to the outside atmosphere. For instance, if compressed air leaks past O-ring 8a or 9a and 10a, it will go to the outside atmosphere, since the space between stem 6 and tube 8 is exposed to outside atmosphere. This is also true of leakage of milk along stem 6 and past O-ring 6a which will flow to the outside atmosphere where it will be readily detected. In short, therefore, there is no direct path between the air cylinder and milk chamber which would permit mixing of air and milk.

It will be readily seen how extremely easy it is to clean the interior of valve body 1, which is accomplished simply by unclamping clamp 15 and withdrawing only the valve body 1 so that it may be separately washed thoroughly, particularly on the inside, without disturbing the valve 5 and its operating parts which seldom have to be taken apart. Being a one piece stainless steel body, the removed valve body assembly may be immersed in hot water for cleaning.

Figure 4:
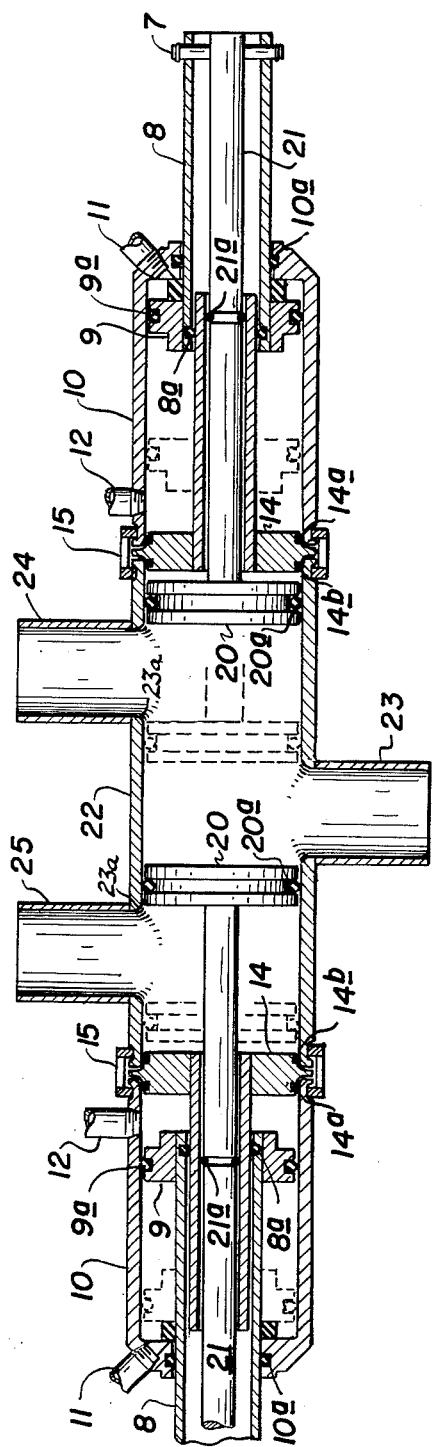
FIG. 4 is a longitudinal, cross-sectional view showing a plurality of valves of the piston type for on-or-off control of liquid flow therethrough, such as milk, and permitting three-way valve operation.

FIG. 4 shows a modification of the valve which is in the form of a three way piston valve for on and off operation. Two units, practically identical to those shown in FIG. 1 and whose parts are referred to by the same reference numerals, are clamped to the end portions of a valve body 22 which is preferably of stainless steel. The only difference in construction is that instead of a valve of the throttling type, such as 5, two pistons 20 are provided, each having peripheral grooves provided with sealing rings 20a. In the position of the valve as shown in full lines, milk will enter through inlet 23 and pass out through outlet 24, but cannot flow to outlet 25 since piston 20, shown at the left of inlet 23, is blocking such flow. However, upon introducing fluid under pressure in the left air chamber through inlet pipe 12, air piston 9 and liquid piston 20 will move in unison to the dotted positions so as to permit flow from port 23 to port 25. Similarly, when air under pressure is introduced into inlet pipe 11 of the right hand air cylinder, its corresponding piston 20 will move across port 24 to the dotted line position so as to block the flow of milk from inlet 23 and outlet 24. Thus by suitable control of the two pistons 20, milk entering inlet port 23 may be diverted so as to flow through either outlet port 24 or 25, or through both outlet ports 24 and 25, thus giving three way operation.

It will be understood that instead of a three way valve body 22, a simple two way or on or off valve having a single inlet and single outlet port may be substituted merely by unclamping the clamps 25, and instead of providing two air operated pistons, only one may be provided and a simple closure member may be clamped thereon, instead of air chamber 10, by clamp 15.

I have made the discovery that as piston ring 20a, which is distorted because under compression, moves past port 24 or 25 so as to relieve the compression (normally of about .005 to .025 inch deflection) as the result of sliding within body 22, there is a tendency for the piston to bulge radially outwardly so that upon the return of the piston away from the transverse port the valve body internal surface effect shearing action on the bulged out portion, causing excessive wear of the O-ring. I have found that by rounding out the corners 23a of the ports to about 1/16 to 1/8" radius and by maintaining a ratio of about 1 7/8" port diameter of the transverse ports 24 and 25 to a valve diameter of 2 1/2", that optimum conditions are obtained, whereby minimum amount of outward bulging of the O-ring results and a minimum shearing or wearing action of the O-ring 20a occurs.

Thus it will be seen that I have provided an efficient valve, either of the throttling type or of the piston type, which may be operated by an air piston (or by hand) to control or divert the flow of a liquid, such as milk, through a separate valve body portion which may be quickly and easily detached for cleaning purposes without affecting the air piston assembly; furthermore, I have provided a valve of the piston type which crosses a transverse port and which has an O-ring in the piston, the valve being so constructed and proportioned as to prevent abnormal wear of the piston ring as it crosses the port; furthermore, I have provided an automatic or air operated valve (or one operated by hand or by other fluids) which is so constructed as to prevent any direct leakage paths between the controlled liquid and the fluid in the operating cylinder, such as air, to not only prevent contamination of air and liquid but to provide an external visual indication of leakage of the liquid to the outside so as to warn the operator that a piston ring must be replaced.

While I have illustrated and described several embodiments of my invention, it will be understood that these are by way of illustration only, and that various changes and modifications may be made within the contemplation of my invention and within the scope of the following claims.

I claim:

1. A valve for controlling the flow of a liquid comprising an actuating valve body, a chamber in said actuating valve body containing an air operated piston and in which fluid under pressure is selectively introduced on opposite sides of said piston, a reciprocable stem partly surrounded by said chamber onto the end of which a liquid controlling element is connected which is exteriorly of said chamber, a liquid flow containing valve body in which said controlled element is reciprocated, clamping means for detachably clamping open end portions of said valve bodies together, a stationary bearing interposed and forming a closure wall between said open end portions and having a pair of sealing rings, one of which seals against intercommunication between the interior of said chamber and outside atmosphere, and the other of which seals against intercommunication between the interior of said liquid flow containing valve body and outside atmosphere, and additional sealing rings between said air operated piston and actuating valve body, leakage of which provides intercommunication only between the interior of said chamber and outside atmosphere and providing no direct leakage path between said valve bodies, said air operated piston having a tubular stem telescopically surrounding a tubular stem of said stationary bearing which, in turn, surrounds said valve stem, the free ends of said stems being exposed to outside atmosphere.

2. Apparatus as recited in claim 1 wherein said flow controlling element is in the form of a piston having a peripheral groove containing a piston ring, and wherein transverse ports are provided having rounded corners of a radius of about 1/8 inch at the jointure of a cylindrical portion of said valve body and a transverse port, the ratio of the diameter of said transverse port to that of said body being approximately 1 7/8 to 2 1/2.

References Cited in the file of this patent

UNITED STATES PATENTS

| | | |
|---|---|---|
| 1,532,253 | Meredith | Apr. 7, 1925 |
| 2,752,119 | Allen | June 26, 1956 |
| 2,759,699 | Rush | Aug. 21, 1956 |
| 2,780,213 | Colling | Feb. 5, 1957 |
| 2,796,887 | Stern | June 25, 1957 |